United States Patent
Kim

(10) Patent No.: US 8,301,835 B2
(45) Date of Patent: Oct. 30, 2012

(54) APPARATUSES AND METHODS PROVIDING REDUNDANT ARRAY OF INDEPENDENT DISKS ACCESS TO NON-VOLATILE MEMORY CHIPS

(75) Inventor: Ho Jung Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 364 days.

(21) Appl. No.: 12/713,559

(22) Filed: Feb. 26, 2010

(65) Prior Publication Data

US 2010/0250848 A1    Sep. 30, 2010

(30) Foreign Application Priority Data

Mar. 25, 2009  (KR) .................. 10-2009-0025494

(51) Int. Cl.
*G06F 12/00*    (2006.01)
(52) U.S. Cl. .................. 711/114; 711/156; 711/173
(58) Field of Classification Search .................. 711/114, 711/156, 173
See application file for complete search history.

(56) References Cited

U.S. PATENT DOCUMENTS 6,275,898 B1 * 8/2001 DeKoning .................. 711/114

2006/0004957 A1    1/2006 Hand, III et al.
2008/0162794 A1    7/2008 Yang
2011/0035541 A1 *  2/2011 Tanaka et al. .................. 711/103

FOREIGN PATENT DOCUMENTS

KR    10-2007-0029978 A    3/2007
KR    10-2008-0093948 A    10/2008

* cited by examiner

*Primary Examiner* — John Lane
(74) *Attorney, Agent, or Firm* — Myers Bigel Sibley & Sajovec, P.A.

(57) ABSTRACT

A controller may include a RAID controller and an access controller. The RAID controller exchanges data with a host and select ones of a plurality of RAID levels responsive to RAID level information. The access controller is connected to the RAID controller and to a plurality of channels that are each connected to a plurality of non-volatile memory chips. The access controller accesses data in at least one of the non-volatile memory chips connected to each of the channels according to the selected RAID level. The controller may alternatively or additionally include a storage device and a main processor. The main processor is configured to logically partition a plurality of non-volatile memory chips that are connected to each of a plurality of channels into a normal partition region and a RAID level partition region, where data access is performed according to a selected RAID level, in response partition information that is stored in the storage device.

10 Claims, 7 Drawing Sheets

APPARATUSES AND METHODS PROVIDING REDUNDANT ARRAY OF INDEPENDENT DISKS ACCESS TO NON-VOLATILE MEMORY CHIPS

CROSS-REFERENCE TO RELATED APPLICATIONS

This application claims priority under 35 U.S.C. §119 to Korean Patent Application No. 10-2009-0025494, filed on Mar. 25, 2009, in the Korean Intellectual Property Office, the disclosure of which is incorporated herein in its entirety by reference.

BACKGROUND

Embodiments of the present invention relate to data storage systems, and more particularly, to systems, controllers and methods that store data in a Redundant Array of Independent/Inexpensive Disks (RAID).

RAID techniques are mainly used in data servers where important data can be replicated in more than one location across a plurality of hard disk drives. By storing data across several hard disks, data reliability and input/output performance may be improved.

SUMMARY

The present general inventive concept provides apparatuses and methods that use RAID techniques to increase data reliability and/or input/output performance.

In accordance with some embodiments, a controller includes a RAID controller and an access controller. The RAID controller is configured to exchange data with a host and to select one of a plurality of RAID levels responsive to RAID level information. The access controller is connected to the RAID controller and to a plurality of channels that are each connected to a plurality of non-volatile memory chips, the access controller is configured to access data in at least one of the non-volatile memory chips connected to each of the channels according to the selected RAID level.

In some further embodiments, the RAID controller includes a plurality of RAID level logic modules that are each configured to perform a different one of the plurality of RAID levels, and a control logic that is configured to selectively enable one of the plurality of RAID level logic modules to perform a selected RAID level responsive to the RAID level information.

In some further embodiments, each of the plurality of RAID level logic modules are separate circuits that are selectively enabled responsive to the RAID level information.

Some other embodiments are directed to a controller that includes a storage device and a main processor. The storage device is configured to store partition information. The main processor is configured to logically partition a plurality of non-volatile memory chips that are connected to each of a plurality of channels into a normal partition region and a RAID level partition region, where data access is performed according to a selected RAID level, in response the partition information stored in the storage device.

In some further embodiments, the controller further includes a RAID controller that is configured to exchange data with a host and to select one of a plurality of RAID levels responsive to the partition information and to RAID level information, and an access controller that is connected to the RAID controller and configured to access data in at least one of the non-volatile memory chips that is in the RAID level partition region according to the selected RAID level.

In some further embodiments, the access controller is further configured to read/write some types of data only in the normal partition region of the non-volatile memory chips and to read/write some other types of data only in the RAID level partition region of the non-volatile memory chips.

In some further embodiments, the main processor is configured to logically define that all non-volatile memory chips that are connected to a first plurality of the channels are within the normal partition region and to logically define that all non-volatile memory chips that are connected to a second plurality of the channels are within the RAID level partition region.

In some further embodiments, the main processor is configured to logically define defines that all non-volatile memory chips that are connected within a first group of addresses along each of the channels are within the normal partition region and to logically define that all non-volatile memory chips that are connected within a second group of addresses along each of the channels are within the RAID level partition region.

Some other embodiments are directed to a data storage system that includes a plurality of channels, a plurality of non-volatile memory chips, a RAID controller, and an access controller. The plurality of non-volatile memory chips are connected to each of the plurality of channels. The RAID controller is configured to exchange data with a host and to select one of a plurality of RAID levels responsive to RAID level information. The access controller is connected to the RAID controller and configured to access data in at least one of the plurality of non-volatile memory chips according to the selected RAID level.

Some other embodiments are directed to a data storage system that includes a plurality of channels, a plurality of non-volatile memory chips, a storage device, and a main processor. The plurality of non-volatile memory chips are connected to each of the plurality of channels. The storage device is configured to store partition information. The main processor is configured to logically partition the plurality of non-volatile memory chips into a normal partition region and a RAID level partition region, where data access is performed according to a selected RAID level, in response the partition information stored in the storage device.

In some further embodiments, the data storage system further includes a RAID controller and an access controller. The RAID controller is configured to exchange data with a host and to select one of a plurality of RAID levels responsive to the partition information and to RAID level information. The access controller is connected to the RAID controller and configured to access data in at least one of the plurality of non-volatile memory chips that is in the RAID level partition region according to the selected RAID level.

In some further embodiments, the RAID controller is further configured to control the access controller so that some types of data are read/written only in the normal partition region of the non-volatile memory chips and so that some other types of data are read/written only in the RAID level partition region of the non-volatile memory chips.

In some further embodiments, the main processor is configured to logically define that all non-volatile memory chips that are connected to a first plurality of the channels are within the normal partition region and to logically define that all non-volatile memory chips that are connected to a second plurality of the channels are within the RAID level partition region.

In some further embodiments, the main processor is configured to logically define that all non-volatile memory chips that are connected within a first group of addresses along each of the channels are within the normal partition region and to logically define that all non-volatile memory chips that are connected within a second group of addresses along each of the channels are within the RAID level partition region.

Some other embodiments are directed to a data processing method that is implemented on a controller. The controller is operated to select one of a plurality of RAID levels based on RAID level information stored in a storage device. The controller is further operated to access at least one of a plurality of non-volatile memory devices connected to each of a plurality of channels according to the selected RAID level.

Some other embodiments are directed to a data processing method that is implemented on a controller. The controller is operated to read partition information stored in a storage device, and to logically partition each of a plurality of non-volatile memory chips connected to each of a plurality of channels into a normal partition region and a RAID level partition region, where data access is performed according to a selected RAID level, in response to the read partition information.

In some further embodiments, the controller is operated to select one of a plurality of RAID levels responsive to RAID level information and to the read partition information, and to access at least one of the plurality of non-volatile memory chips, which is in the RAID level partition region, according to the selected RAID level.

In some further embodiments, the controller is operated to logically designate that all non-volatile memory chips that are connected to a first plurality of the channels are within the normal partition region and to logically designate that that all non-volatile memory chips that are connected to a second plurality of the channels are within the RAID level partition region.

In some further embodiments, the controller is operated to logically designate that all non-volatile memory chips that are connected within a first group of addresses along each of the channels are within the normal partition region and to logically designate that all non-volatile memory chips that are connected within a second group of addresses along each of the channels are within the RAID level partition region.

BRIEF DESCRIPTION OF THE DRAWINGS

These and/or other aspects and advantages of the present invention will become apparent and more readily appreciated from the following description of the embodiments, taken in conjunction with the accompanying drawings of which.

Figure 1:
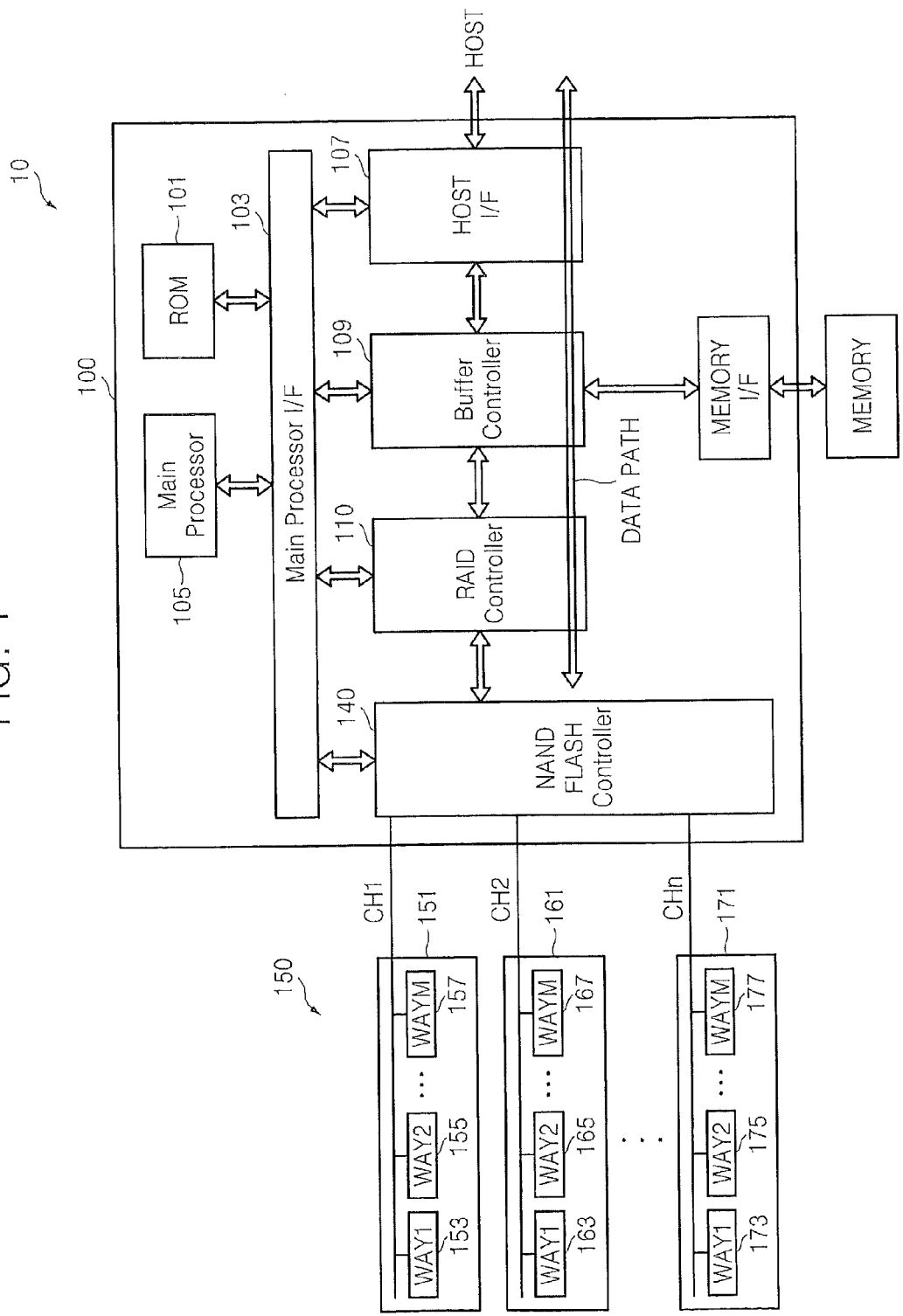
FIG. 1 shows a block diagram of a data storage system according to some embodiments of the present invention.

DETAILED DESCRIPTION OF EMBODIMENTS
OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof. Although some of the diagrams include arrows on communication paths to show a primary direction of communication, it is to be understood that communication may occur in the opposite direction to the depicted arrows.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams of methods, systems and controllers according to embodiments of the invention. It will be understood that each block of the flowchart illustrations and/or block diagrams, and combinations of blocks in the flowchart illustrations and/or block diagrams, can be implemented by computer program instructions performed on a processor of a general purpose computer, special purpose computer, or other programmable data processing apparatus to produce a machine. Accordingly, the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce computer implemented methods and processes such that the instructions which execute on the computer or other programmable apparatus provide steps for implementing the functions/acts specified in the flowchart and/or block diagram block or blocks.

Accordingly, a "controller" as described herein may be configured as hardware circuitry and/or as a data processing circuit that performs software that is embodied therein or accessible thereto.

FIG. 1 shows a block diagram of a data storage system according to some embodiments of the present invention. Referring to FIG. 1, a data storage system 10 may include a controller circuit 100 and a non-volatile memory device 150.

During a write operation or a program operation, the controller 100 responds to a write command or a program command output from a host to write or program a write data or a program data output from the host to a non-volatile memory device 150 according to a RAID level or a RAID protocol, which is selected based on defined RAID information among a plurality of RAID levels. In addition, during a read operation, the controller 100 responds to a read command from a host to transmit data by reading data from the non-volatile memory device 150 according to a RAID level or a RAID protocol selected among a plurality of RAID levels based on defined RAID level information.

The non-volatile memory device 150 may include a plurality of memory blocks 151, 161, and 171, and each of the memory blocks 151, 161, and 171 may include a plurality of ways. As used herein, a "way" may mean a separate semiconductor chip that is capable of storing and retrieving data through a communication channel (e.g., address and data lines on a memory board). Accordingly, M ways, where M is a natural number, may mean that M semiconductor chips are connected to a channel.

A plurality of memory blocks 151, 161, and 171 may be connected to corresponding channels CH1, CH2, and CHn, respectively. Here, a channel may mean at least a data line where RAID data is transmitted. For example, at least a memory block 151, 161, and 171 may form a Solid State Disk or Solid State Drive (SSD).

The way may include a plurality of non-volatile memory cells. The plurality of memory cells may be configured as a Electrically Erasable Programmable Read-Only Memory (EEPROM), a flash memory, a Magnetic RAM (MRAM), a Spin-Transfer Torque MRAM, a Conductive bridging RAM (CBRAM), a Ferroelectric RAM (FeRAM), a Phase Change RAM (PRAM), a Resistive RAM (RRAM or ReRAM), a Nanotube RRAM, a Polymer RAM (PoRAM), a Nano Floating Gate Memory (NFGM), a Holographic memory, a Molecular Electronics Memory Device, and/or an Insulator Resistance Change Memory. The non-volatile memory cells may each store 1 or more bits.

According to some embodiments, the data storage system 10 may further include a volatile memory device. The volatile memory device may buffer data which is exchanged between a host and a non-volatile memory device 150. The volatile memory device may be embodied as a DRAM, a SRAM, and/or a SDRAM.

The way or the volatile semiconductor device may include a Package On Package (PoP), Ball Grid Arrays (BGAs), Chip Scale Packages (CSPs), a Plastic Leaded Chip Carrier (PLCC), Plastic Dual In-Line Package (PDIP), Die in Waffle Pack, Din in Wafer Form, Chip On Board (COB), CERamic Dual In-Line Package (CERDIP), plastic metric quad flat pack (MQFP), Thin Quad FlatPack (TQFP), small outline (SOIC), shrink small outline package (SSOP), thin small outline (TSOP), system in package (SIP), multi chip package (MCP), wafer-level fabricated package (WFP), and/or wafer-level processed stack package (WSP).

The controller 100, which may be configured as a SSD controller, may include a storage device 101 for storing RAID level information and/or partition information, a main processor interface 103, a main processor 105, a host interface 107, a buffer controller circuit 109, a RAID controller circuit 110, and an access controller circuit 140. A data path DATA PATH may transmit data between the non-volatile memory device 150 and a host. The storage device 101 may be configured as a non-volatile memory device, such as a ROM, and configured as a non-volatile memory cell such as a way.

A main processor 105 may interpret an access command, e.g., a write command, a program command, a read command, or an erase command, output from a host and respond thereto by controlling operation of at least some of the components 107, 109, 110, and 140. Additionally, the main processor 105 may write RAID level information and/or partition information output from a host to the storage device 101 or read the RAID level information and/or the partition information stored in the storage device 101, and transmit read information to the RAID controller 110.

When the controller 100 does not include a buffer controller 109, a host interface (I/F) 107 may interface data signals which are exchanged between the host and the RAID controller 110. When the controller 100 includes the buffer controller 109, the host interface 107 may interface data signals exchanged between the host and the buffer controller 109. In this case, a memory interface may interface data signals exchanged between the buffer controller 109 and a volatile memory device.

A RAID controller 110 may enable a RAID level selected among a plurality of RAID levels according to RAID level information and interface data signals exchanged between an access controller 140 and a buffer controller 109 according to an enabled RAID level or RAID protocol.

According to an embodiment, the RAID controller 110 may select and enable a RAID level among a plurality of RAID levels based on at least one of RAID level information and defined partition information, and may control data signals exchanged between the access controller 140 and the buffer controller 109 according to an enabled RAID level or RAID protocol.

An access controller 140 may access at least one of a plurality of non-volatile memory chips 153, 155, 157, 163, 165, 167, 173, 175, and 177, connected to each of the plurality of the channels CH1, CH2, and CHn, based on an access command, e.g., a write command, a program command, or an erase command, output from the RAID controller 110 for processing data, e.g., a write data, a program data, or an erase data, output from the RAID controller 110 that are defined by a RAID level selected by the RAID controller 110.

According to an embodiment, the access controller 140 may perform an access operation by channel or way. In addition, the access controller 140 may read data from at least one of a plurality of non-volatile memory chips 153, 155, 157, 163, 165, 167, 173, 175, and 177, connected to each of a plurality of the channels CH1, CH2, and CHn, that are defined by a RAID level selected by the RAID controller 110 based on an access command, e.g., a read command, and an address output from the RAID controller 110.

When a non-volatile memory device 150 is configured as a NAND flash memory, the access controller 140 may be configured as a NAND flash controller. That is, the access controller 140 may be configured responsive to the type of non-volatile memory cells embodied in the ways 153, 155, 157, 163, 165, 167, 173, 175, and 177.

As illustrated in FIG. 1, the controller 100 may access at least one corresponding way defined by a selected RAID level.

For example, during a write operation or a program operation the RAID controller 110 can select a RAID level 0 (striped set without parity or striping), RAID level 1 (Mirrored set without parity or Mirroring), RAID level 2 (Hamming code parity), RAID level 3 (Striped set with dedicated parity, bit interleaved parity, or byte level parity), RAID level 4 (Block level parity), RAID level 5 (Striped set with distributed parity or interleave parity), RAID level 6 (Striped set with dual distributed parity), RAID level 7, RAID level 10 and RAID level 53 or selects a RAID level which merged at last two of the RAID levels, e.g., RAID 0+1, RAID 1+0, RAID 5+0, RAID 5+1, or RAID 0+1+5, and the controller 100 may write or program data output from a host to at least one of a plurality of ways according to the selected RAID level.

In addition, the RAID controller 110 embodied in the controller 100 during a read operation may read data, stored in at least one of a plurality of ways according to a RAID level selected based on RAID level information among a plurality of RAID levels, and transmit the read data to a host through the data path DATA PATH. According to an embodiment, a buffer controller 109 may temporarily store data, e.g., a write data, a program data, a read data or an erase data, in a volatile memory device through a memory interface.

Figure 2:
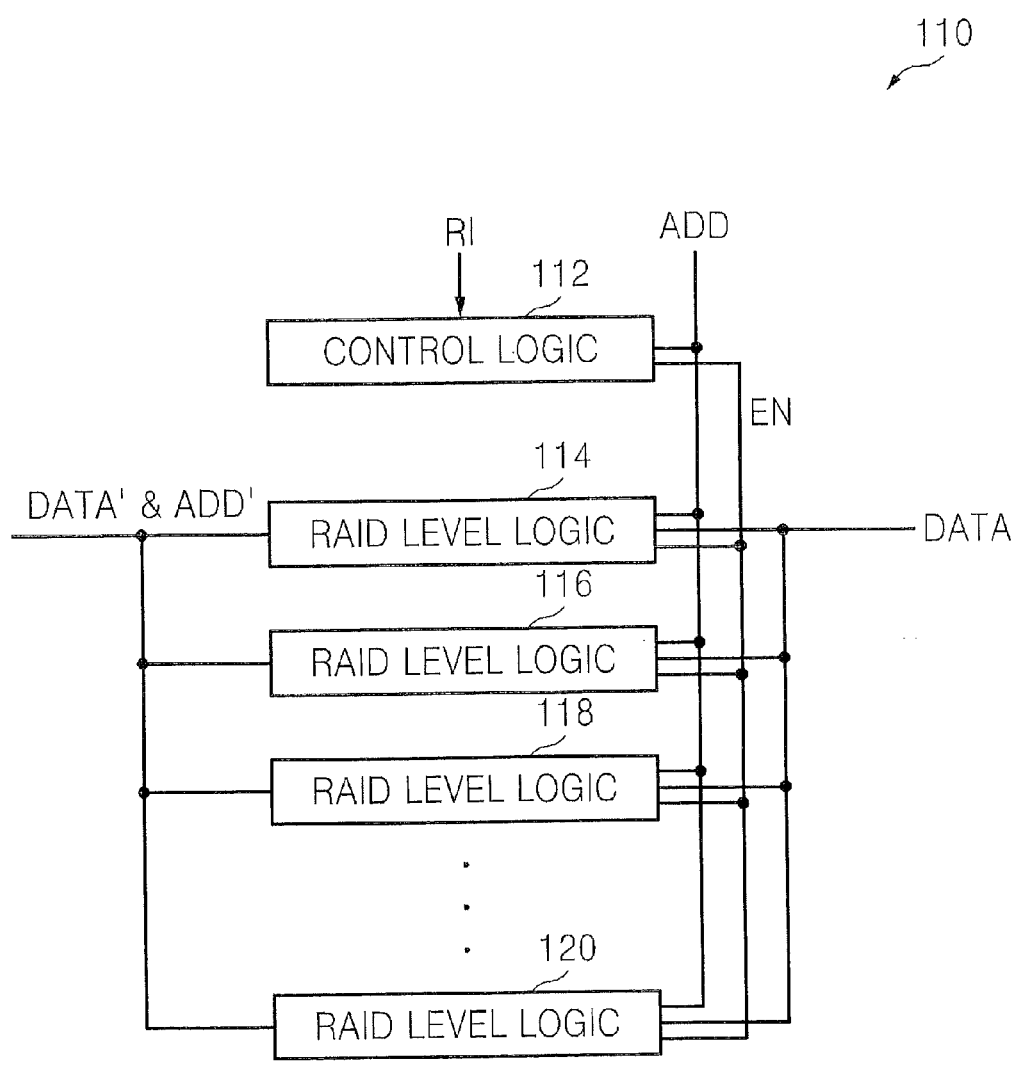
FIG. 2 shows an exemplary embodiment of the RAID controller illustrated in FIG. 1.

FIG. 2 shows an exemplary embodiment of the RAID controller illustrated in FIG. 1. Referring to FIG. 2, a RAID controller 110 may include a control logic 112 and a plurality of RAID level logic modules 114, 116, 118, and 120. As used herein, a "logic module" may be configured as circuit hardware and/of data processing circuit hardware that performs software that is embedded therein or accessible thereto.

The plurality of RAID level logic modules 114, 116, 118 and 120 may control data read/write access in the non-volatile memory 150 to each perform a different one of the different RAID levels. Each RAID level may correspond to a single defined RAID level or a combination of RAID levels. The plurality of RAID level logic modules 114, 116, 118 and 120 may convert input data DATA and input address ADD so that the corresponding memory data access performs the corresponding RAID level, and transmit the converted data DATA' and converted address ADD' to the access controller 140, respectively. Accordingly, the access controller 140 may access at least one way in response to the converted data DATA' and the converted address ADD'. In one embodiment, each of the RAID level logic modules 114, 116, 118 and 120 are separate circuits.

For example, a first RAID level logic module 114 can be configured to provide RAID level 1, a second RAID level logic module 116 can be configured to provide RAID level 3, a third RAID level logic module 118 can be configured to provide RAID level 5, and another RAID level logic module 120 can be configured to provide RAID level 0+1 access to at least some of the non-volatile memory chips 153-172.

A main processor 105 during an access operation may read RAID level information RI stored in a storage device 101 and transmit it to a control logic 112 of the RAID controller 110 in response to an access command output from a host. Accordingly, the control logic 112 may enable one of a plurality of RAID logic module levels 114, 116, 118 and 120 according to at least one of address ADD and RAID level information RI. Accordingly, the controller 100 may control transmission of access data exchanged between a host and a non-volatile memory device 150 according to a RAID level that is selected by the RAID controller 110.

Figure 3:
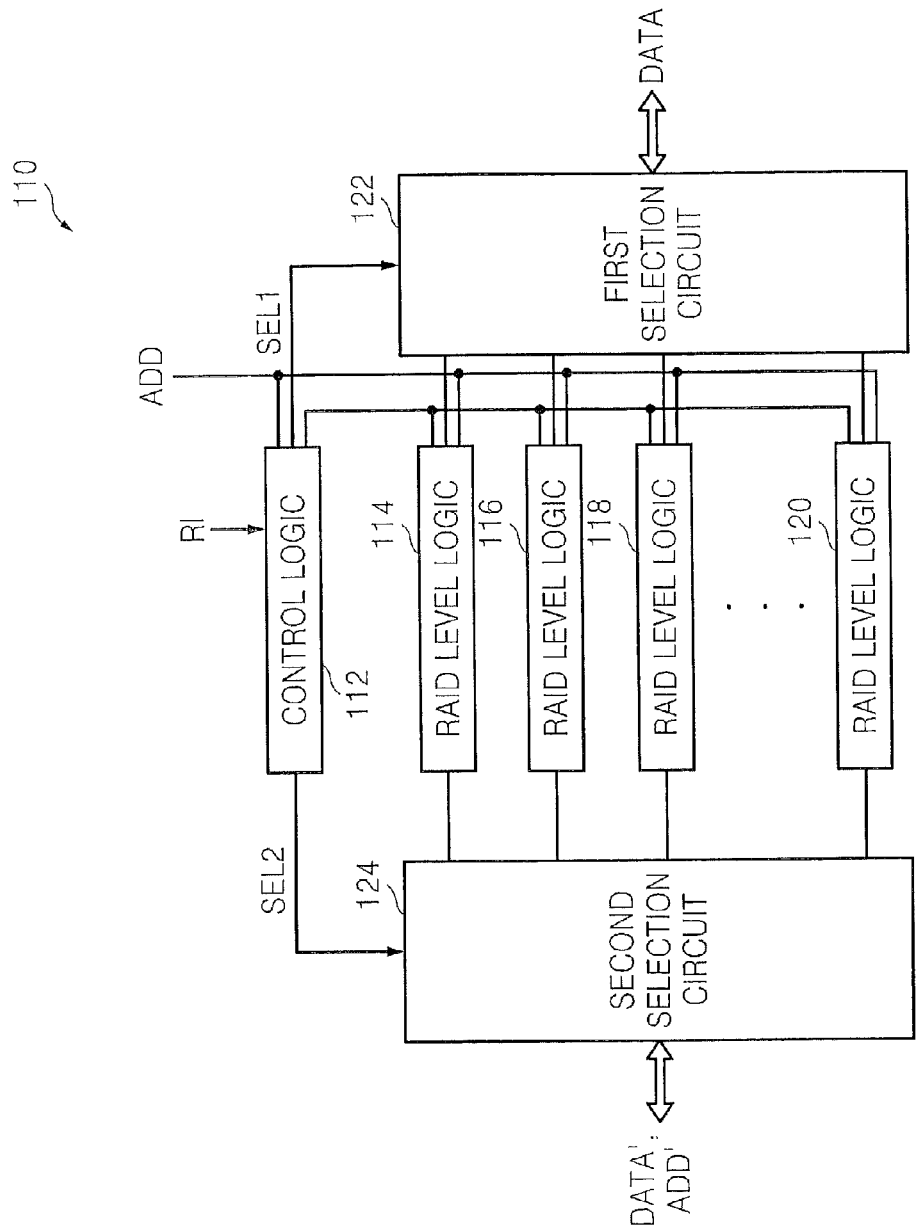
FIG. 3 shows another exemplary embodiment of the RAID controller illustrated in FIG. 1.

FIG. 3 shows another exemplary embodiment of the RAID controller illustrated in FIG. 1. The RAID controller 110 illustrated in FIG. 3 is different than the RAID controller 110 illustrated in FIG. 2, and may further include a first selection circuit 122 and a second selection circuit 124. A control logic 112 may generate a first selection signal SEL1 for controlling an operation of the first selection circuit 122 and a second selection signal SEL2 for controlling an operation of the second selection circuit 124 based on RAID level information RI. The first selection circuit 122 and the second selection circuit 124 may determine a data path respectively according to each of the first selection signal SEL1 and the second selection signal SEL2.

Figure 4:
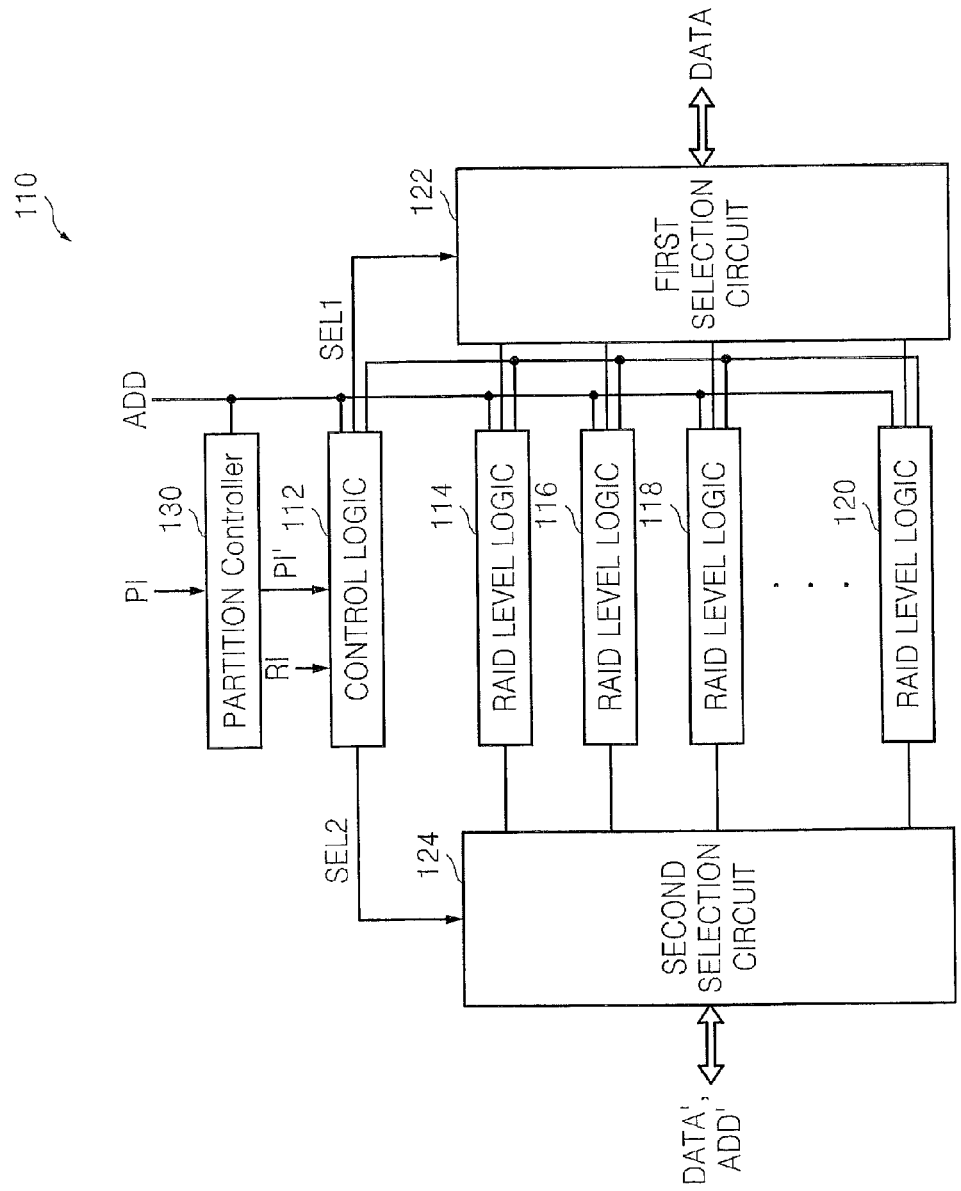
FIG. 4 shows another exemplary embodiment of the RAID controller illustrated in FIG. 2.

FIG. 4 shows another exemplary embodiment of the RAID controller illustrated in FIG. 2. Referring to FIGS. 1 to 4, the main processor 105 of the controller 100 may logically partition each of non-volatile memory chips 153, 155, 157, 163, 165, 167, 173, 175, and 177 connected to each of the channels CH1 to CHn into a normal partition region and another RAID level partition region where a RAID level is applied based on partition information PI stored in a storage device 101. A partition controller 130 may output newly generated partition information PI' to a control logic 112 based on an address and the partition information PI. According to some embodiments, the partition information PI and the newly generated partition information PI' may be the same as each other.

The control logic 112 of the RAID controller 110 may select one of a plurality of RAID levels based on the partition information PI and the RAID level information RI as explained above for FIG. 3.

An access controller 140 is connected to the RAID controller 110 and may access at least one of the plurality of non-volatile memory chips 153, 155, 157, 163, 165, 167, 173, 175, and 177, which is in a RAID level partition region, for processing data according to a selected RAID level.

Figure 5:
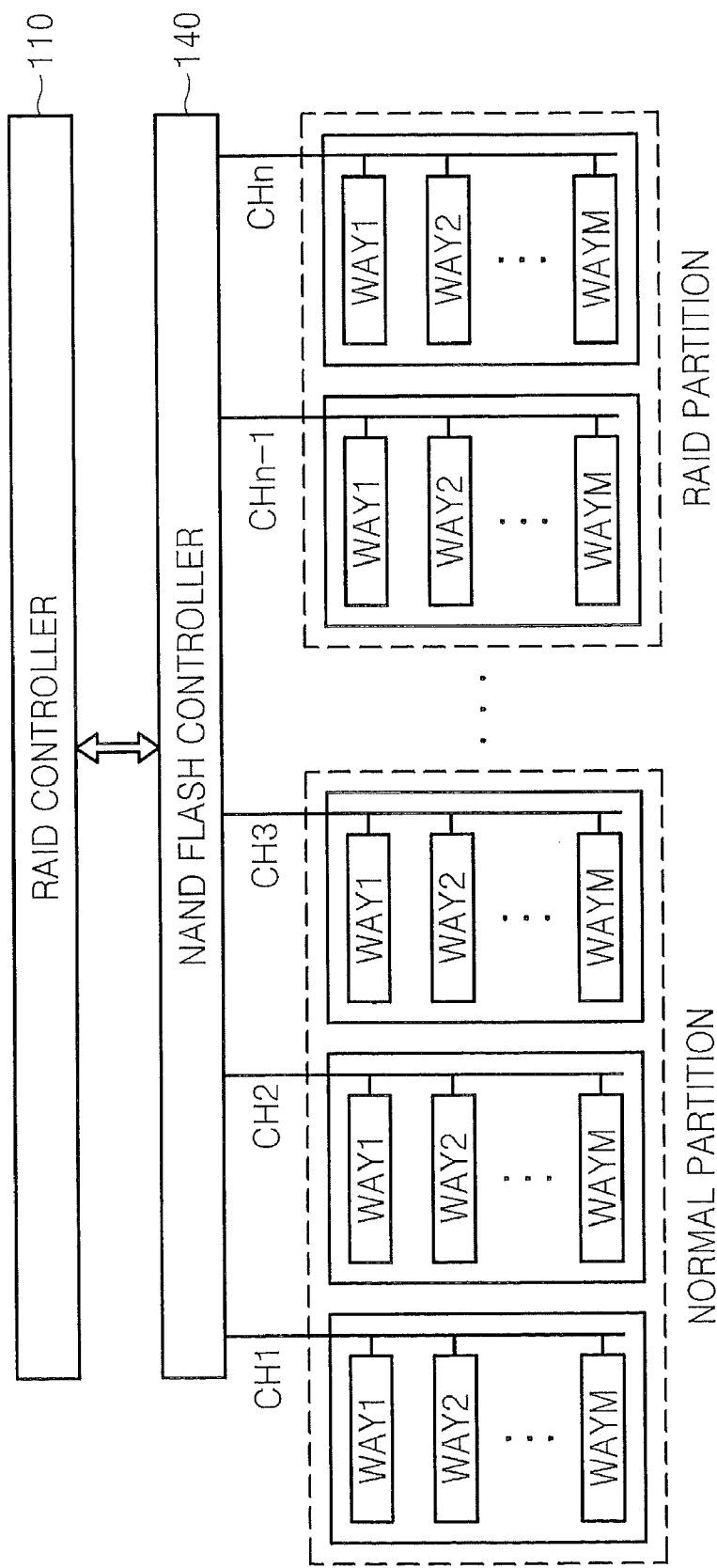
FIG. 5 is a block diagram of methods and operations for partitioning data in accordance with some embodiments of the present invention.

FIG. 5 is a block diagram of methods of partitioning data according to some embodiments of the present invention. A plurality of non-volatile memory chips are divided into a normal partition region and a RAID level partition region where a RAID level may be applied by the main processor 105. As illustrated in FIG. 5, the main processor 105 may dynamically define/redefine the normal partition region from the RAID level partition region.

For example, important data, such as code data or operating system (OS) data, may be stored in the RAID level partition region where a RAID level may be applied, and user data, such as video or pictures, may be stored in the normal partition region. In this case, the access controller 140 may access the RAID level partition region according to a RAID level selected by the RAID controller 110.

As illustrated in FIG. 5, the main processor 105 may separate the normal partition from the RAID level partition region where a defined RAID level is applied to memory access made through the associated channels. Accordingly, the normal partition region and the RAID level partition region may each include at least one channel.

Figure 6:
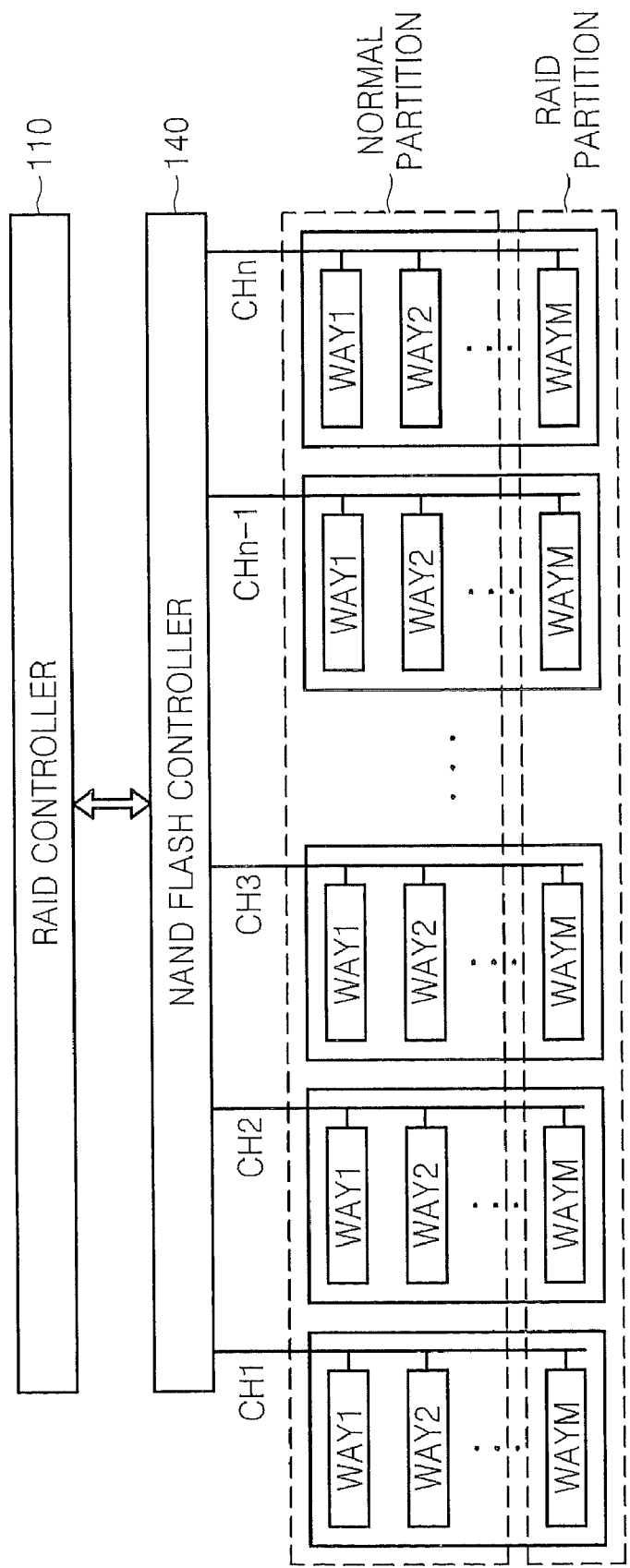
FIG. 6 is a block diagram of methods and operations for partitioning data in accordance with some other embodiments of the present invention.

FIG. 6 is a block diagram of methods of partitioning data in accordance with some other embodiments of the present invention. Referring to FIG. 6, a normal partition region may include a first way to (M−1)th way connected to each channel, and a RAID level partition region may include only a last way WAYM connected to each channel. The main processor 105 may thereby set a normal partition region including at least one way and a RAID level partition region including at least one way based on partition information PI.

In some embodiments, the main processor 105 is configured to logically define that all non-volatile memory chips that are connected to a first plurality of the channels are within the normal partition region and to logically define that all non-volatile memory chips that are connected to a second plurality of the channels are within the RAID level partition region. In some other embodiments, the main processor 105 is configured to logically define that all non-volatile memory chips that are connected within a first group of addresses along each of the channels are within the normal partition region and to logically define that all non-volatile memory chips that are connected within a second group of addresses along each of the channels are within the RAID level partition region.

For example, important data, such as a code data or OS data, may be stored in the RAID level partition region where a RAID level may be applied to all data accesses within that region, and user data, such as a video or pictures, may be stored in the normal partition region where data accesses within that region are preformed without using RAID. In this case, an access controller 140 may access the RAID level partition region according to a RAID level selected by a RAID controller 110.

Figure 7:
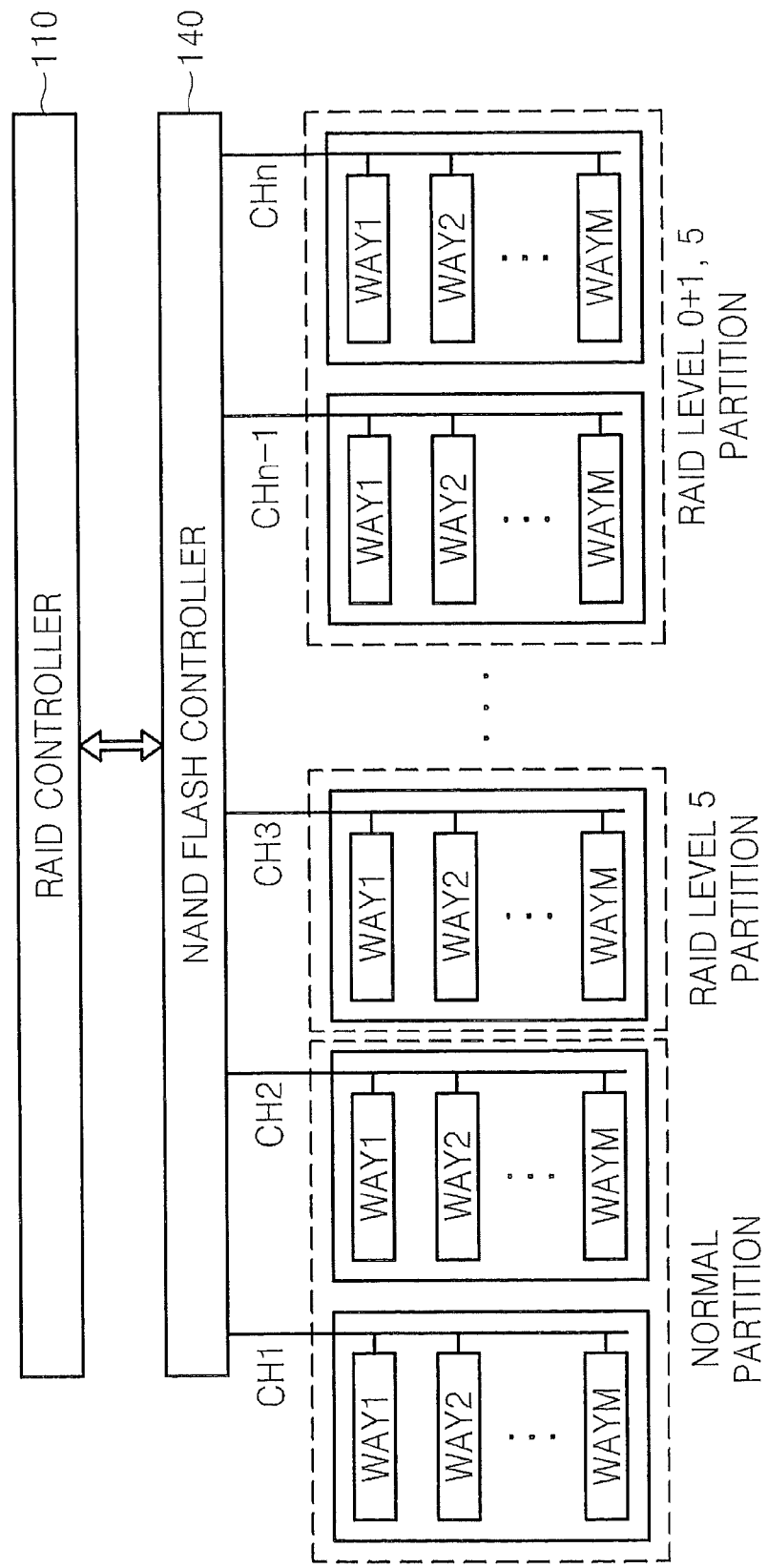
FIG. 7 is a block diagram of methods and operations for partitioning data in accordance with some other embodiments of the present invention.

FIG. 7 is a block diagram of methods of partitioning data in accordance with some other embodiments of the present invention. Referring to FIGS. 1 and 7, the main processor 105 may set at least one normal partition region and at least one RAID level partition region according to partition information PI. As illustrated in FIG. 7, one of a plurality of RAID level partition regions of the non-volatile memory chips 153-177 may be configured as a RAID level 5 partition and another one of the plurality of RAID level partition regions may be configured as a RAID level 0+1 and 5 partition.

In this case, as illustrated in FIG. 2, one of a plurality of RAID level logic modules may be configured to carry out RAID level 5 for the RAID level 5 partition region and another one of the RAID level logic modules may be configured to carry out RAID level 0+1 and 5 for the RAID level 0+1 and 5 partition region. Here, the control logic 112 may select one of the RAID level logic modules that is configured to apply the RAID level 5 to read/write first data from/to the non-volatile memory chips 153-177 and may select another one of the RAID logic modules that is configured to apply the RAID level 0+1 and 5 to read/write second data from/to the non-volatile memory chips 153-177 based on RAID level information RI and partition information PI.

These systems, controllers and methods may thereby provide RAID techniques that may increase data read/write/retention reliability, data input/output performance, and/or reduce the associated manufacturing costs.

Although various embodiments of the present invention have been shown and described, it will be appreciated by those skilled in the art that changes may be made in these embodiments without departing from the principles and spirit of the general inventive concept, the scope of which is defined in the appended claims and their equivalents.

What is claimed is:

1. A controller comprising:
a storage device that is configured to store partition information; and
a main processor that is configured to logically partition a plurality of non-volatile memory chips that are connected to each of a plurality of channels into a normal partition region and a RAID level partition region, where data access is performed according to a selected RAID level, in response to the partition information stored in the storage device.

2. The controller of claim 1, further comprising:
a RAID controller that is configured to exchange data with a host and to select one of a plurality of RAID levels responsive to the partition information and to RAID level information; and
an access controller connected to the RAID controller and configured to access data in at least one of the non-volatile memory chips that is in the RAID level partition region according to the selected RAID level.

3. The controller of claim 2, wherein the access controller is further configured to read/write some types of data only in the normal partition region of the non-volatile memory chips and to read/write some other types of data only in the RAID level partition region of the non-volatile memory chips.

4. The controller of claim 1, wherein the main processor is configured to logically define that all non-volatile memory chips that are connected to a first plurality of the channels are within the normal partition region and to logically define that all non-volatile memory chips that are connected to a second plurality of the channels are within the RAID level partition region.

5. The controller of claim 1, wherein the main processor is configured to logically define that all non-volatile memory chips that are connected within a first group of addresses along each of the channels are within the normal partition region and to logically define that all non-volatile memory chips that are connected within a second group of addresses along each of the channels are within the RAID level partition region.

6. A data storage system comprising:
a plurality of channels;
a plurality of non-volatile memory chips connected to each of the plurality of channels;
a storage device that is configured to store partition information; and
a main processor that is configured to logically partition the plurality of non-volatile memory chips into a normal partition region and a RAID level partition region, where data access is performed according to a selected RAID level, in response to the partition information stored in the storage device.

7. The data storage system of claim 6, further comprising:
a RAID controller that is configured to exchange data with a host and to select one of a plurality of RAID levels responsive to the partition information and to RAID level information; and
an access controller connected to the RAID controller and configured to access data in at least one of the plurality of non-volatile memory chips that is in the RAID level partition region according to the selected RAID level.

8. The data storage system of claim 7, wherein the RAID controller is further configured to control the access controller so that some types of data are read/written only in the normal partition region of the non-volatile memory chips and so that some other types of data are read/written only in the RAID level partition region of the non-volatile memory chips.

9. The data storage system of claim 7, wherein the main processor is configured to logically define that all non-volatile memory chips that are connected to a first plurality of the channels are within the normal partition region and to logically define that all non-volatile memory chips that are connected to a second plurality of the channels are within the RAID level partition region.

10. The data storage system of claim 7, wherein the main processor is configured to logically define that all non-volatile memory chips that are connected within a first group of addresses along each of the channels are within the normal partition region and to logically define that all non-volatile memory chips that are connected within a second group of addresses along each of the channels are within the RAID level partition region.

* * * * *